United States Patent
Moon et al.

(10) Patent No.: US 8,136,374 B2
(45) Date of Patent: Mar. 20, 2012

(54) FLOAT BATH SYSTEM FOR MANUFACTURING FLOAT GLASS AND COOLING METHOD OF THE SAME

(75) Inventors: Won-Jae Moon, Seoul (KR); Sang-Oeb Na, Seoul (KR); Yang-Han Kim, Goyang-si (KR); Hyung-Young Oh, Goyang-si (KR); Young-Sik Kim, Seoul (KR); Kil-Ho Kim, Suwon-si (KR); Heui-Joon Park, Incheon (KR); Chang-Hee Lee, Osan-si (KR)

(73) Assignee: LG Chem, Ltd., Seoul (KR)

( * ) Notice: Subject to any disclaimer, the term of this patent is extended or adjusted under 35 U.S.C. 154(b) by 57 days.

(21) Appl. No.: 12/715,095

(22) Filed: Mar. 1, 2010

(65) Prior Publication Data
US 2010/0223957 A1    Sep. 9, 2010

(30) Foreign Application Priority Data
Mar. 3, 2009  (KR) .................. 10-2009-0018046

(51) Int. Cl.
*C03B 5/44* (2006.01)

(52) U.S. Cl. ................ 65/162; 65/99.3; 65/158; 65/355
(58) Field of Classification Search ................... 65/99.2, 65/182.3, 182.5, 355, 99.3, 162, 158
See application file for complete search history.

(56) References Cited

U.S. PATENT DOCUMENTS

| | | | | |
|---|---|---|---|---|
| 5,351,632 A | * | 10/1994 | Mann | 110/190 |
| 2004/0134202 A1 | * | 7/2004 | Omura et al. | 62/64 |
| 2008/0223079 A1 | * | 9/2008 | Kamihori et al. | 65/99.3 |

* cited by examiner

*Primary Examiner* — Matthew Daniels
*Assistant Examiner* — Yana Belyaev
(74) *Attorney, Agent, or Firm* — McKenna Long & Aldridge LLP

(57) ABSTRACT

Disclosed is a float bath system for manufacturing a float glass, comprising a block assembly having a plurality of blocks connected to each other and configured to store a molten metal therein; a steel casing surrounding the block assembly; an air blower capable of supplying air to the steel casing; and a cooling water spray member capable of spraying a cooling water onto the steel casing. And, a cooling method of said float bath system is disclosed.

2 Claims, 3 Drawing Sheets

FLOAT BATH SYSTEM FOR MANUFACTURING FLOAT GLASS AND COOLING METHOD OF THE SAME

CROSS-REFERENCE TO RELATED APPLICATION

This application claims priority to Korean Patent Application No. 10-2009-0018046 filed in Republic of Korea on Mar. 3, 2009, the entire contents of which are incorporated herein by reference.

BACKGROUND OF THE INVENTION

1. Field of the Invention

The present invention relates to a float bath system for manufacturing a float glass and a cooling method of the same, and more particularly, to a float bath system for manufacturing a float glass which has an improved structure to cool a steel casing surrounding blocks for molten metal storage, and a cooling method of the same.

2. Description of the Related Art

Generally, an apparatus for manufacturing a float glass (also known as a sheet glass, a flat glass or a plate glass) using a float glass process is used to manufacture a continuous sheet of glass having a ribbon shape of a predetermined width by continuously supplying a molten glass onto a flowing molten metal (a molten tin and so on) stored in a float bath while floating the molten glass on the molten metal to form a molten glass ribbon reaching around an equilibrium thickness due to the surface tension and gravity, and pulling up the molten glass ribbon toward an annealing lehr near an exit of the float bath.

Here, the molten metal includes, for example, a molten tin or a molten tin alloy, and has a greater specific gravity than the molten glass. The molten metal is received in a float chamber where a reducing atmosphere of hydrogen ($H_2$) and/or nitrogen ($N_2$) gas is introduced. The float bath in the float chamber is configured to contain the molten metal therein. The float bath has a horizontally extending structure, and includes a high heat resistant material (for example, bottom blocks) therein. The molten glass forms a molten glass ribbon on the surface of the molten metal while moving from an upstream end of the float bath to a downstream end. The molten glass ribbon is lifted up at a location set on the downstream end of the float bath, so called a take-off point, to be removed from the molten metal, and delivered to an annealing lehr of a next process.

Meanwhile, the molten metal in the float chamber is maintained in a high-temperature state (for example, about 600 to 1100° C.), and a melting temperature of the molten metal (molten tin) is 232° C. Thus, it needs to cool down the bottom of the float bath to about 120 to 130° C. For this purpose, a conventional float bath system has an air blower for cooling a steel casing of the float bath by blowing an air to the lower surface of the steel casing.

However, if the operation of a driving source, for example a fan by which the air blower is driven, is suddenly stopped, it takes a considerable time to normalize the operation of the air blower. During the time the air blower is stopped, temperature of the bottom of the float bath increases, and consequently, tin existing around the bottom of the float bath returns into a liquid state and reacts with the steel casing, so that unnecessary alloys are formed and bubbles ($O_2$) are created. In a severe instance, a hole may be generated in the steel casing, which should be replaced by a new steel casing.

Though a severe instance does not occur, contamination taking place during an abnormal operation as stated above changes the internal temperature of the float bath in the range of, for example −5° C. to +5° C. Such change in temperature changes the flow of molten metal, so that bubbles are created. This phenomenon causes surface defects (OBB (Open Bottom Bubble) or BOS (Bottom Open Seed)) of float glass products.

SUMMARY OF THE INVENTION

The present invention is designed to solve the above-mentioned problems, and therefore it is an object of the present invention to provide a float bath system for manufacturing a float glass, which has a separate cooling water spray member operated to cool a steel casing of a float bath when an air blower for cooling the float bath breaks down, thereby preventing an increase in temperature of the bottom of the float bath, and a cooling method of the same.

To achieve the object, a float bath system for manufacturing a float glass according to the present invention comprises a block assembly having a plurality of blocks connected to each other and configured to store a molten metal therein; a steel casing surrounding the block assembly; an air blower capable of supplying air to the steel casing; and a cooling water spray member capable of spraying a cooling water onto the steel casing.

Preferably, the cooling water spray member has a plurality of nozzle assemblies arranged below the steel casing in a preset pattern.

Preferably, the plurality of nozzle assemblies are arranged such that the center of each nozzle assembly is consistent with the center of an interface of adjacent blocks.

Preferably, each nozzle assembly has a radial nozzle unit capable of radially spraying a cooling water within a preset radius from the center of the interface between the blocks.

To achieve the object, a cooling method of a float bath system for manufacturing a float glass according to a preferred embodiment of the present invention comprises (a) cooling a steel casing through air supplied from an air blower installed below the steel casing surrounding a block assembly configured to store a molten metal therein; and (b) cooling the steel casing using a cooling water spray member installed below the steel casing.

Preferably, the step (b) is carried out when the step (a) is impracticable.

Preferably, in the step (b), a cooling water is sprayed toward the center of an interface between a plurality of blocks of the block assembly.

EFFECTS OF THE PRESENT INVENTION

The float bath system for manufacturing a float glass according to the present invention and the cooling method of the same continuously cool the bottom of the float bath using a separate cooling water spray member even though an air blower suddenly breaks down to prevent an increase in temperature of the bottom of the float bath, thereby improving the quality of float glass products and ensuring the procedural stability.

BRIEF DESCRIPTION OF THE DRAWINGS

The accompanying drawings illustrate the preferred embodiments of the present invention and are included to provide a further understanding of the spirit of the present invention together with the detailed description of the invention, and accordingly, the present invention should not be limitedly interpreted to the matters shown in the drawings

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 1:
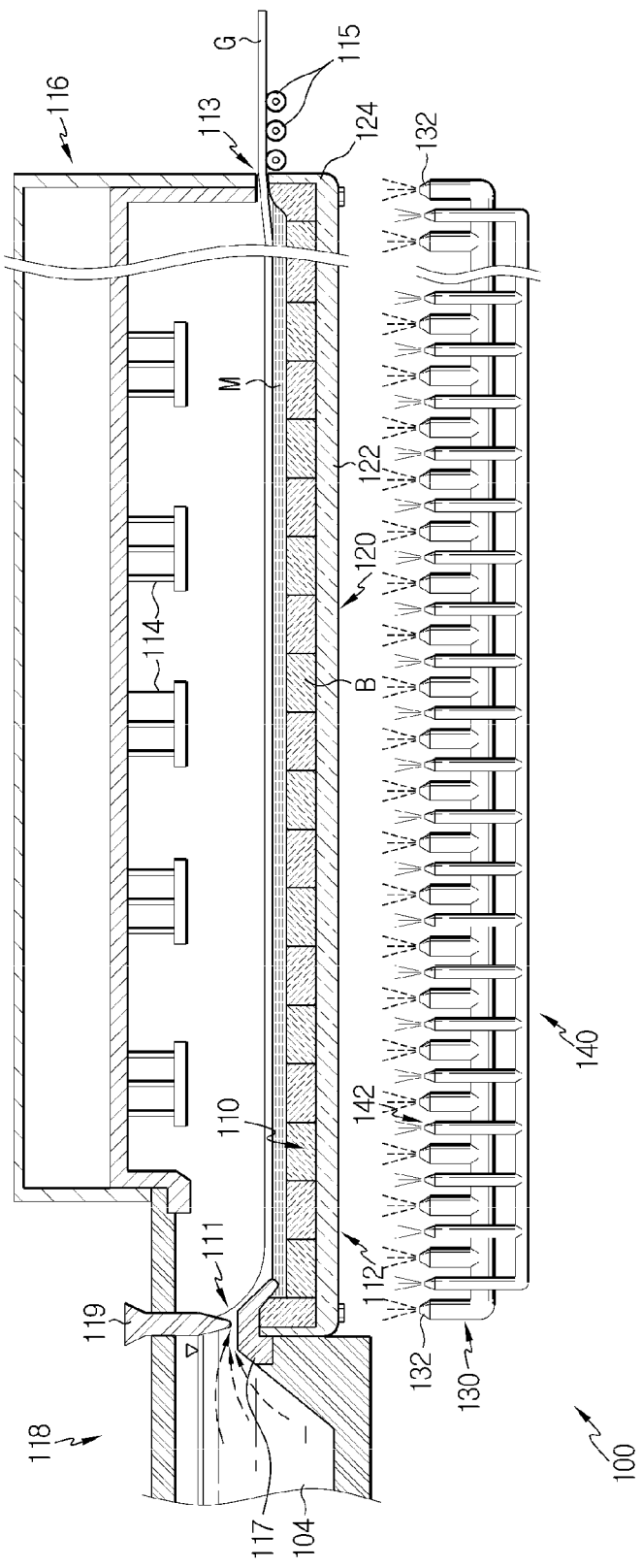
FIG. 1 is a schematic front elevation view of a float bath system for manufacturing a float glass according to a preferred embodiment of the present invention.
Figure 2:
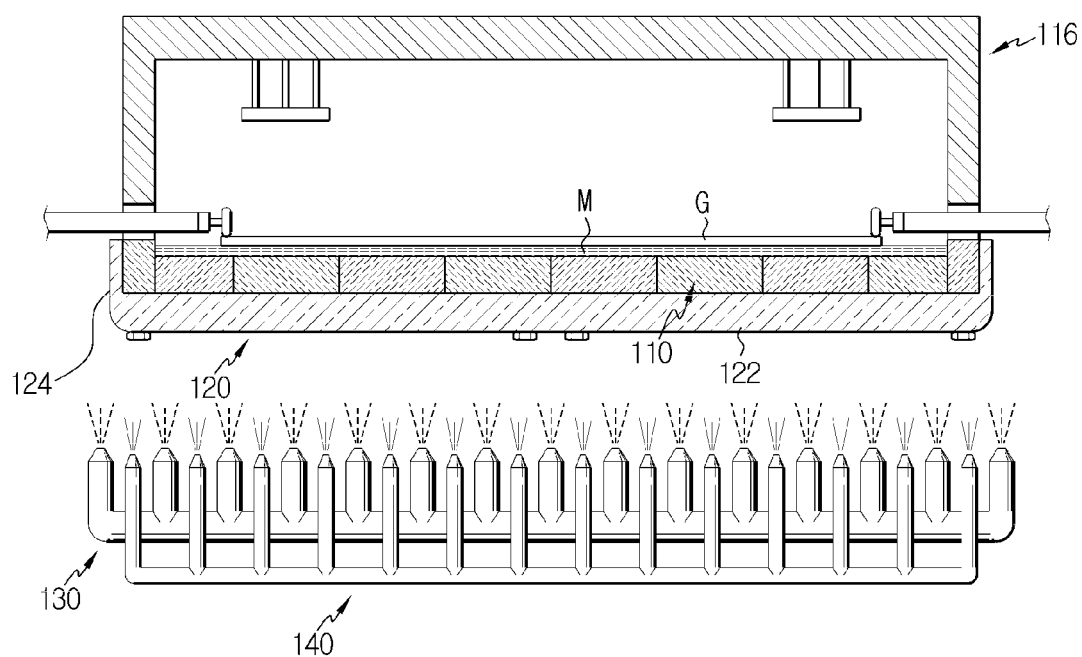
FIG. 2 is a side view of FIG. 1.

FIG. 1 is a schematic front elevation view of a float bath system for manufacturing a float glass according to a preferred embodiment of the present invention. FIG. 2 is a side view of FIG. 1.

Referring to FIGS. 1 and 2, the float bath system 100 for manufacturing a float glass according to an embodiment of the present invention comprises a block assembly 110, a steel casing 120, an air blower 130 and a cooling water spray member 140. The block assembly 110 includes a plurality of blocks (B) and stores a molten metal (M) therein. The steel casing 120 is installed to surround the block assembly 110. The air blower 130 has an air supply pipe through which air is supplied to the steel casing 120 to cool the steel casing 120. The cooling water spray member 140 sprays the cooling water onto the steel casing 120.

The float bath system 100 for manufacturing a float glass according to an embodiment of the present invention is configured to manufacture a float glass using a so called float glass process. The float bath system 100 includes a float chamber 118, and the float chamber 118 has a float bath 112 located at a lower portion thereof and a roof 116 covering the top of the float bath 112 and having electric resistance heating elements 114. The float chamber 118 is an airtight type that has an input port 111 and an output port 113.

The float bath 112 stores a molten metal (M) therein, such as a molten tin, a molten tin alloy and so on. A molten glass (G) is stored in a melting furnace 104, metered through a threshold 117 and a level control tweel 119, and flown into the float bath 112. While the molten glass (G) is supplied from an upstream end of the float bath 112 (shown at the left side of the drawing) and flows to a downstream end (shown at the right side of the drawing), the molten metal (M) runs by the flow of molten glass (G). The molten metal (M) flows from the upstream end of the float bath 112 to the downstream end due to a temperature gradient in the float bath 102, and at the same time, flows from the center of the float bath 112 to both sides of the float bath 112. The temperature gradient is a difference in temperature between the downstream end (Cold End) and the upstream end (Hot End) which is maintained at a relatively higher temperature. The molten glass (G) forms a molten glass ribbon having preferred thickness and width while flowing from the upstream end of the float bath 112 to the downstream end, and the molten glass ribbon is lifted up at a take-off point by lift-out rollers 115 installed at the output port 113 of the float chamber 118, to be removed from the surface of the molten metal (M), and drawn out toward an annealing lehr (not shown) of a next process.

The atmosphere in the float chamber 118 is formed by a mixed gas of nitrogen and hydrogen. The mixed gas is maintained at pressure slightly higher than the external atmosphere, and the molten metal (M) and the molten glass ribbon is maintained at about 800 to 1300° C. by the electric resistance heating elements 114. The molten glass (G) is a nonalkaline glass, a soda-lime glass, and so on. The principle and structure for flow generation of the molten metal (M) in the float bath 112, and input, ribbonization, movement and discharge of the molten glass (G) are well known in a typical float glass process, and the detailed description is omitted herein.

The block assembly 110 is formed by lining connection of a plurality of blocks (B) such as refractory blocks. The block assembly 110 may include bottom lining blocks for directly storing the molten metal (M), and bottom refractory blocks arranged in contact with the inner surface of the steel casing 120 and surrounding the bottom lining blocks. In this case, an inorganic adhesive is preferably filled between the blocks (B) including the bottom lining blocks and the bottom refractory blocks. The interval between the blocks (B) of the block assembly 110 is preferably determined in consideration of length of the blocks (B) that may increase during heating, and so on. The blocks (B) need wear resistance against the molten metal (M), resistance against alkali such as $K_2O$ or $Na_2O$ contained in the molten glass (G), spalling resistance enabling adaptation of float glass products to changes in temperature, and so on. The block assembly 110 may include bottom blocks defining the bottom of the float bath 112 and side blocks defining the side of the float bath 112.

The steel casing 120 includes a bottom casing 122 and a side casing 124. The bottom casing 122 surrounds the bottom blocks, and the side casing 124 is connected with the bottom casing 122 and surrounds the side blocks. Preferably, the steel casing 120 is made of a typical metal having sufficient rigidity and thickness to support the block assembly 110.

The air blower 130 is arranged in a predetermined pattern between a support frame (not shown) and the bottom of the float bath 112, i.e., the lower surface of the steel casing 120. The air blower 130 cools the steel casing 120 down to a predetermined temperature by air going out through air discharge openings 132. Typically, the air blower 130 is driven by a driving source, for example a fan. That is, the blocks assembly 110 and the steel casing 120 that is heated by a high temperature atmosphere in the float bath 112 is cooled by the air blower 130.

The cooling water spray member 140 is preferably set into operation when operation of the air blower 130 is abnormally stopped by, for example, power failure, breakdown of a fan, and so on. That is, in a normal instance, the steel casing 120 of the float bath 112 is cooled by air coming out of the air blower 130. However, in an abnormal instance, for example when a fan for driving the air blower 130 breaks down or the power supply is cut off, the steel casing 120 is temporarily cooled down by the cooling water spray member 140 until the operation of the air blower is normalized. For this purpose, the cooling water spray member 140 has a plurality of nozzle assemblies 142 arranged below the steel casing 120 in a preset pattern.

Figure 3:
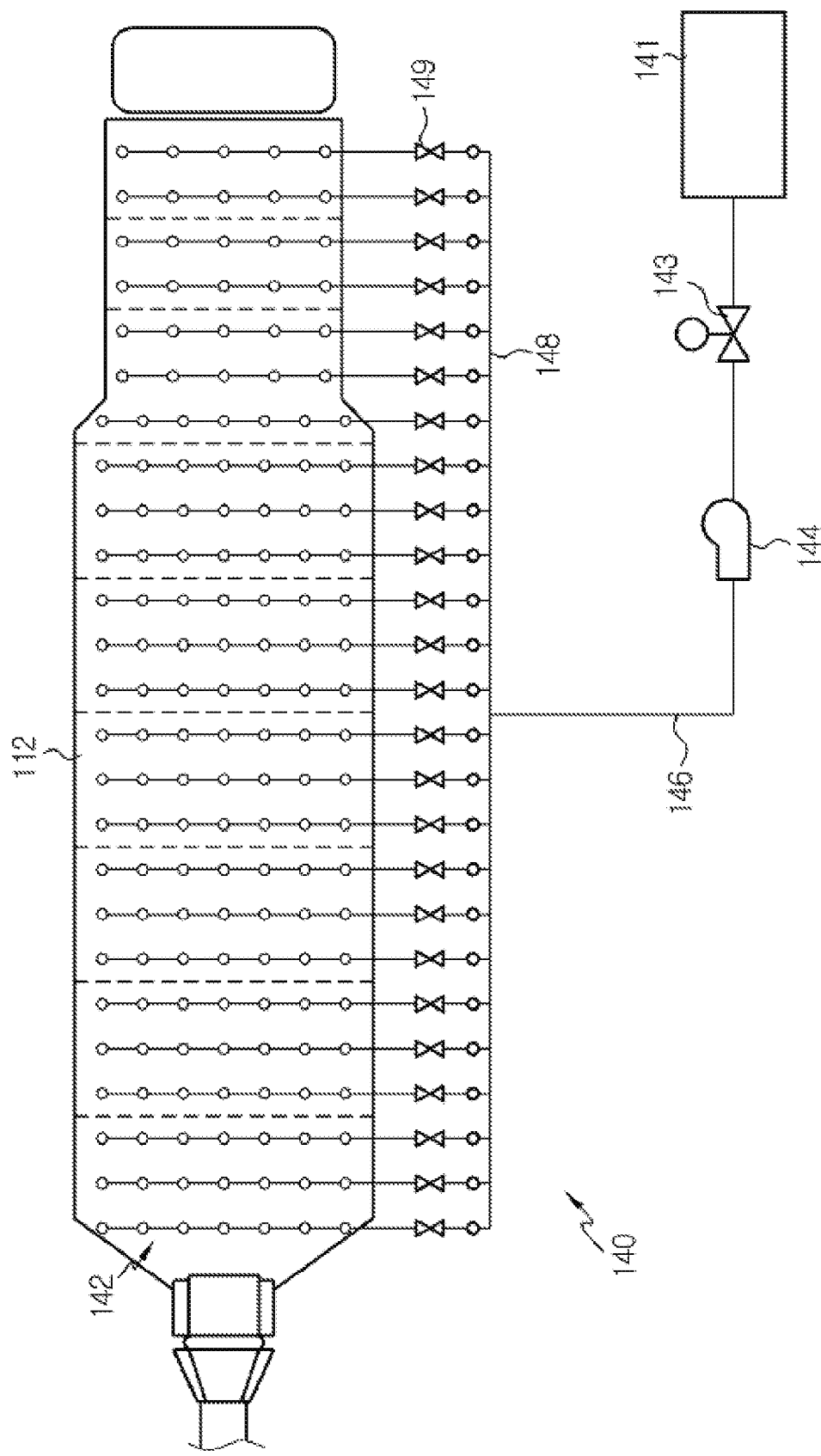
FIG. 3 is a schematic plan view illustrating an arrangement pattern of a cooling water spray member according to a preferred embodiment of the present invention.

FIG. 3 is a schematic plan view illustrating an arrangement pattern of a cooling water spray member, in particular, nozzle assemblies according to a preferred embodiment of the present invention.

Referring to FIG. 3, the cooling water spray member 140 according to an embodiment of the present invention has a plurality of nozzle assemblies 142. Each nozzle assembly 142 is located on a sub-route 148. The nozzle assemblies 142 include, but are not limited to, a nozzle of any form known now or hereafter, if it is capable of spraying a cooling water onto a circle having a predetermined radius extending radially from the center of the interface between the blocks (B).

A cooling method of a float bath for manufacturing a float glass according to a preferred embodiment of the present invention comprises (a) cooling the steel casing 120 through air supplied from the air blower 130 surrounding a block assembly configured to store a molten metal therein, and (b) cooling the steel casing 120 using the cooling water spray member 140 below the steel casing 120. As mentioned above, the step (b) is controlled to carry out when the step (a) is impracticable. And, the step (b) is set to spray a cooling water toward the center of the interface between a plurality of blocks (B) of the block assembly 110.

Hereinabove, the present invention is described with reference to the limited embodiments and drawings. However, the description proposed herein is just a preferable example for the purpose of illustrations only, not intended to limit the scope of the invention, so it should be understood that other equivalents and modifications could be made thereto without departing from the spirit and scope of the invention.

What is claimed is:

1. A float bath system for manufacturing a float glass, comprising:
    a block assembly having a plurality of blocks connected to each other and configured to store a molten metal therein;
    a steel casing surrounding the block assembly;
    an air blower capable of supplying air to the steel casing; and
    a cooling water spray member capable of spraying a cooling water onto the steel casing,
    wherein the cooling water spray member is activated upon interruption of the air blower,
    wherein the cooling water spray member has a plurality of nozzle assemblies arranged below the steel casing in a preset pattern, and
    wherein the plurality of nozzle assemblies are arranged such that the center of each nozzle assembly is consistent with the center of an interface of adjacent blocks.

2. The float bath system for manufacturing a float glass according to claim 1,
    wherein each nozzle assembly has a radial nozzle unit capable of radially spraying a cooling water within a preset radius from the center of the interface between the blocks.

* * * * *